United States Patent [19]

Watts

[11] Patent Number: 6,040,667
[45] Date of Patent: Mar. 21, 2000

[54] SYSTEM AND METHOD FOR DRIVING WIPERS IN A WINDSHIELD WIPER SYSTEM

[75] Inventor: John Christopher Watts, Gates Mills, Ohio

[73] Assignee: Valeo Elecrical Systems, Inc., Auburn Hills, Mich.

[21] Appl. No.: 08/570,914

[22] Filed: Dec. 12, 1995

[51] Int. Cl.[7] .................................................. H02P 1/00
[52] U.S. Cl. ........................ 318/280; 318/443; 318/444; 318/DIG. 2; 307/10; 160/11; 73/861.41; 115/250.13; 115/50.21; 115/256.5
[58] Field of Search .................................. 318/443, 280, 318/444, DIG. 2; 307/10; 160/11; 73/861.41; 74/117; 15/250.13, 250.21, 256.5

[56] References Cited

U.S. PATENT DOCUMENTS

| | | | |
|---|---|---|---|
| 2,698,910 | 1/1955 | Blyth | 310/51 |
| 2,827,582 | 3/1958 | Krebs | 310/168 |
| 3,585,874 | 6/1971 | Ingham | 74/333 |
| 3,797,368 | 3/1974 | Martelli | 493/197 |
| 3,913,478 | 10/1975 | Terzuolo et al. | 101/232 |
| 4,013,829 | 3/1977 | Baar et al. | 358/299 |
| 4,019,434 | 4/1977 | Hoexter | 101/216 |
| 4,057,374 | 11/1977 | Seybold | 418/36 |
| 4,261,684 | 4/1981 | Norton et al. | 414/695 |
| 4,320,329 | 3/1982 | Gille et al. | 318/443 |
| 4,362,104 | 12/1982 | Imai et al. | 101/349 |
| 4,386,490 | 6/1983 | Griffith et al. | 53/148 |
| 4,413,560 | 11/1983 | Rogge | 101/247 |
| 4,473,920 | 10/1984 | Itani | 15/250.22 |
| 4,499,826 | 2/1985 | Regge | 101/181 |
| 4,527,105 | 7/1985 | Shiraishi | 318/444 |
| 4,544,870 | 10/1985 | Kearns et al. | 318/444 |
| 4,565,127 | 1/1986 | Pichler et al. . | |
| 4,602,562 | 7/1986 | Ottenhues et al. | 101/182 |
| 4,625,157 | 11/1986 | Phillimore | 318/443 |
| 4,634,944 | 1/1987 | Hastings et al. | 318/443 |
| 4,663,575 | 5/1987 | Juzswik et al. | 318/444 |
| 4,672,253 | 6/1987 | Tajima et al. | 310/269 |
| 4,689,535 | 8/1987 | Tsunoda et al. | 318/443 |
| 4,692,645 | 9/1987 | Gotou | 310/184 |
| 4,761,576 | 8/1988 | Savage | 310/51 |
| 4,774,424 | 9/1988 | Habermann | 310/90.5 |
| 4,864,927 | 9/1989 | Niehaus | 101/181 |
| 4,874,975 | 10/1989 | Hertrich | 310/186 |
| 4,890,024 | 12/1989 | Hashimoto et al. | 310/49 R |
| 4,933,584 | 6/1990 | Harms et al. | 310/162 |
| 4,947,066 | 8/1990 | Ghibu et al. | 310/49 R |
| 4,947,092 | 8/1990 | Nabha et al. | 318/444 |
| 5,030,899 | 7/1991 | Nishibe et al. | 318/444 |
| 5,086,245 | 2/1992 | Sieja et al. | 310/216 |
| 5,173,651 | 12/1992 | Buckley et al. | 318/701 |
| 5,184,927 | 2/1993 | Judy | 409/143 |
| 5,239,924 | 8/1993 | Wallmann et al. | 101/179 |
| 5,306,992 | 4/1994 | Droge | 318/483 |
| 5,331,257 | 7/1994 | Materne et al. | 318/85 |
| 5,440,945 | 8/1995 | Penn | 74/117 |

*Primary Examiner*—Karen Masih
*Attorney, Agent, or Firm*—J. Gordon Lewis

[57] ABSTRACT

A wiper system and method for use in a wiper system on a vehicle, such as an automobile, a truck, an agricultural vehicle, and the like is shown having a wiper motor having a drive shaft which is driven at a substantially linear rate. A first gear is cooperatively coupled to the output shaft and driven thereby at the linear rate. A second gear is coupled to the first gear and it is driven in response to the movement of the drive shaft. The second gear is operatively coupled to a third gear which drives a crank which is coupled to a plurality of wiper blades via suitable linkage. The system and method are have at least one gear which is non-symmetrical about its axis which enables or cause the crank to be driven at a non-linear rate relative to the rate of the drive shaft. In one embodiment, the second and third gears are elliptical and are situated such that the velocity of the wiper blades in the wiper system are driven at a velocity which is less than the velocity of the drive shaft during the inwipe and outwipe positions and higher than the velocity of the drive shaft when the wiper blades move away from the outwipe or inwipe position. The velocity is also cause to begin decreasing as the wiper blades move from the center wipe position towards the inwipe or outwipe position.

24 Claims, 1 Drawing Sheet

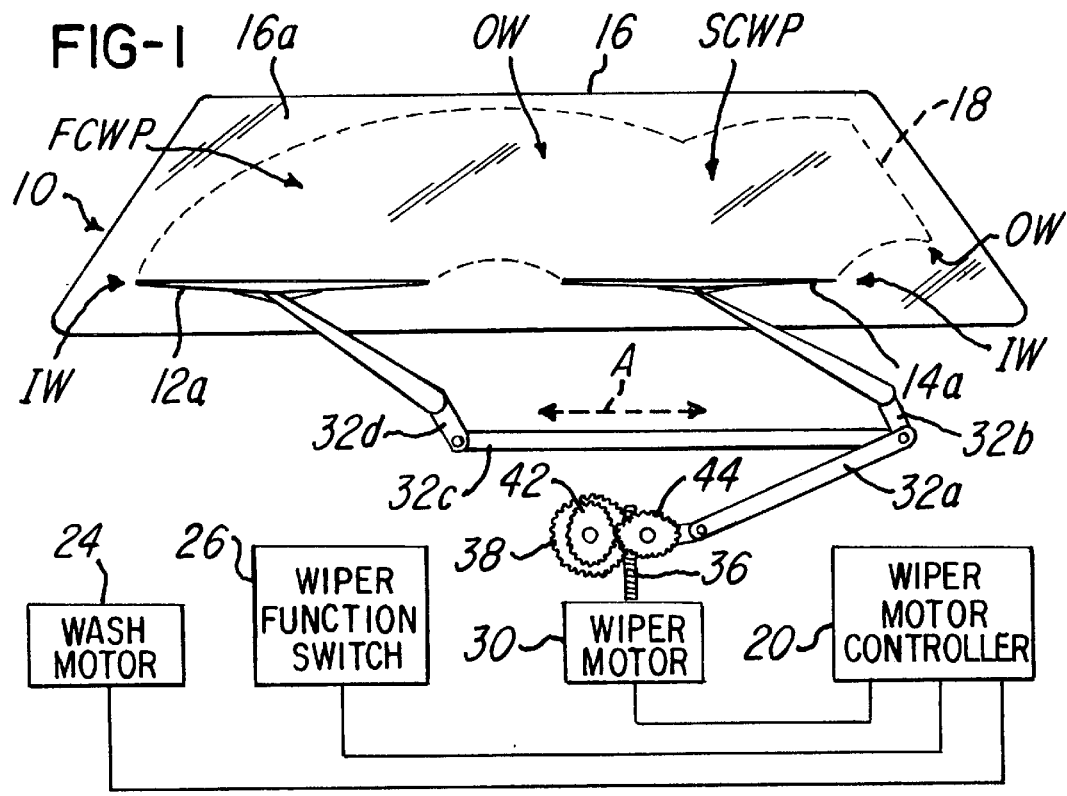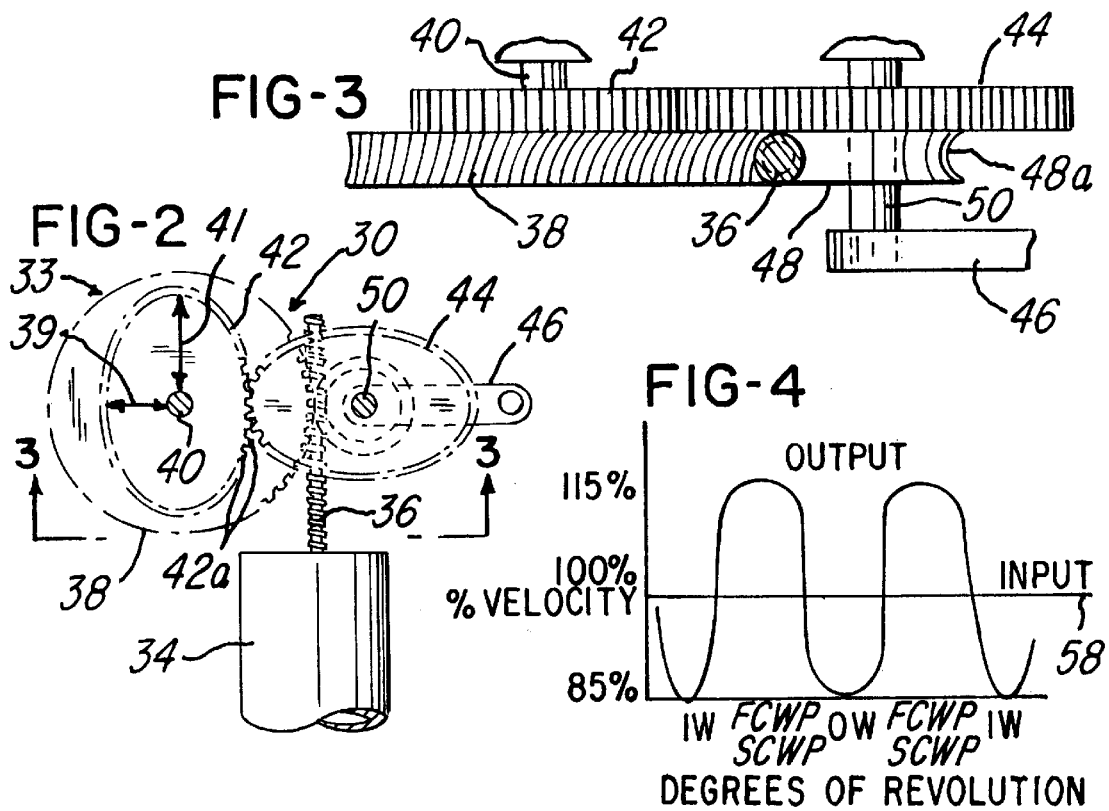

SYSTEM AND METHOD FOR DRIVING WIPERS IN A WINDSHIELD WIPER SYSTEM

BACKGROUND OF THE INVENTION

1. Field of the Invention

This invention relates to a system and method for wiping a windshield and more particularly, a system and method for driving at least one wiper at a non-linear rate in response to a linear input.

2. Description of Related Art

In wiper systems of the past, wiper blades are generally driven between an inwipe or inner-wipe position and an outwipe position at a substantially linear rate. Typically, a wiper motor having a generally cylindrical input gear is coupled by suitable linkage to a plurality of wiper blades. The wiper motor in the and prior art systems drove the linkage at a generally linear velocity.

It was not common that a relatively significant load, wear and stress was placed on the wipers and linkage when the wipers reversed directions in an inwipe area and an outwipe area. This was particularly true when the wipers were operated at high, constant velocities.

Unfortunately, this stress required that systems be designed such that they could handle the wear and tear encountered. This resulted in systems being designed to have robust features, such as heavy frame components, large link balls, heavy drive links and heavy duty bearings.

Consequently, the wiper systems of the prior art often required increased area in which to operate, increased cost, and in some cases, the wiper systems increased component weight, resulting in an increase in overall vehicle weight.

SUMMARY OF THE INVENTION

It is, therefore, a primary object of the invention to provide a system and method for driving at least one wiper in a wiper system in a non-linear rate in response to a generally linear input.

Another object of the invention is to provide a system and method for wiping a windshield by driving at least one wiper at a a generally sinusoidal rate (hereinafter "sinusoidal rate") such that the wipers decelerate as they approach an inwipe or area and an outwipe area.

Still another object of the invention is to provide a system and method which utilizes at least one gear which is non-symmetrical about it's axis, thereby facilitating driving at least one wiper at a non-linear rate.

In one aspect, this invention comprises a wiper system for wiping a windshield, said wiper system comprising at least one wiper a driver coupled to at least one wiper for driving at least one wiper at a non-linear velocity.

In another aspect, this invention comprises a method for driving at least one wiper at a non-linear rate, said method comprising the steps of energizing a linear drive motor to drive an output shaft at a substantially linear rate, and driving at least one wiper at a non-linear rate in response to the linear drive motor.

In another aspect, this invention comprises a method for wiping a windshield comprising the step of driving at least one wiper at a sinusoidal rate.

In still another aspect, this invention comprises a wiper motor drive system for use in a wiper system comprising an wiper motor comprising an output shaft, the wiper motor driving the output shaft at a substantially linear rate, first gear means coupled to the output shaft, second gear means for coupling to a wiper and also for being operatively coupled to the first gear means; the first and second gear means being configured to drive said wiper at a non-linear rate in response to the wiper motor driving said output shaft.

Still another object is to provide a system and method which utilizes a pair of elliptical gears in a gear train which drives a crank at a sinusoidal rate in response to a linear input.

These and other objects and advantages of the invention will be apparent from the following description, the accompanying drawings and the appended claims.

BRIEF DESCRIPTION OF THE DRAWINGS

FIG. 1 is a view of a wiper system according to an embodiment of present invention;

FIG. 2 is a partly broken away top view of a drive system having a drive motor and a plurality of elliptical or non-symmetric gears;

FIG. 3 is a fragmentary sectional view taken along the line 3—3 in FIG. 2; and

FIG. 4 is a graph plotting an input velocity of a drive shaft relative to an output velocity of a crank which drives one or more wipers in the wiper system.

DESCRIPTION OF THE PREFERRED EMBODIMENT

Referring now to FIG. 1 a wiper system 10 is shown. The wiper system 10 comprises a first wiper 12 and a second wiper 14 having a first wiper blade 12a and a second wiper blade 14a, respectively, detachably secured thereto. The wiper blades 12a and 14a operatively engage a surface 16a of a windshield 16 for purposes of wiping a wipe area 18 on the surface 14a free of unwanted liquids or materials, such as rain water, washing fluid, snow, ice, and the like.

The wiper system 10 further comprises a wiper motor controller 20 coupled to a washer motor 24 which is capable of pumping a fluid (not shown) onto surface 16a in response to a washer signal received from wiper motor controller 20. Wiper system 10 further comprises a wiper function switch 26 which is coupled to wiper motor controller 20 which is situated near an operator to enable the operator to operate the wiper system 10.

Advantageously, this invention provides a system and method for driving at least one wiper at a harmonic or non-linear rate which, in turn, facilitates reducing wear and tear on the various components of the wiper system 10.

The wiper system 10 further comprises a wiper driver 30 which is coupled to wipers 12 and 14 via a gear train 33 (FIG. 2) which is coupled to suitable linkage arms 32a, 32b, 32c and 32d (FIG. 1), as shown.

As best illustrated in FIGS. 2 and 3, the wiper driver 30 comprises a drive motor 34 having an output shaft 36. In the embodiment being described, the output shaft 36 is a worm gear which is operatively coupled to a mating driven gear 38 having a generally cylindrical shape in cross-section, as shown in FIG. 3. In the embodiment being described, the driven gear 38 comprises a diameter of approximately 2.75 inches and is driven at a linear velocity of about 45–90 rpms. Notice that driven gear 38 is mounted on a shaft 40 which also has a first gear 42 secured thereto. The first gear 42 is matingly coupled to and drives a second gear 44 which is mounted to a common shaft 50 having an output crank 46 secured thereto. The output crank 46 is coupled to and drives linkage arm 32a (FIG. 1).

Although not shown, the wiper motor 34 and associated gear train 33 may be situated in a suitable housing (not shown), such as an aluminum cast housing of the type which is conventionally known.

Further, a diametral line or perimeter of each of the first and second gears 42 and 44 may have a perimeter measurement P which defines an ellipse and which is obtained by applying the formula:

$$p = 3.1416 \times \sqrt{2(a^2 + b^2)},$$

where a is represented by line 39 in FIG. 2 and b is represented by line 41 in FIG. 2. The approximate measurement for the perimeter of the embodiment being described is on the order of about 20.6 inches, where a is about 2.75 inches and b is about 3.75 inches. It should be appreciated, however, that the perimeter dimension may be selected to vary as desired. It should also be appreciated that while the gears 42 and 44 are shown in FIGS. 2 and 3 as being substantially the same, they could have different shapes and/or sizes in order to facilitate in achieving desired velocities.

As best illustrated in FIG. 3, the second gear 44 comprises a support blank 48 which is also mounted on a common shaft 50. The support blank 48 is coaxial with the second gear 44 and comprises a concave support surface 48a which facilitates supporting output shaft 36 as it drives driven gear 38.

As best illustrated in FIG. 2, the first gear 42 and second gear 44 are generally elliptical in shape. Thus, it should be appreciated that the teeth associated with first and second gears 42 and 44 are asymmetrically situated. Thus, the teeth 42a for gear 42 (FIG. 2) are asymmetrically situated about the axis of first gear 42.

In operation, the first and second gears 42 and 44 cooperate to transform the linear input from drive shaft 36 which is driven at a first velocity to a non-linear output, thereby causing crank 46 to be driven at a non-linear second velocity.

In this regard, FIG. 4 illustrates an input velocity 58 corresponding to the velocity at which driven gear 38 is driven by drive motor 34. A sinusoidal output velocity 60 represents the velocity at which common shaft 50 or crank 46 in response to the input 58.

In this regard, notice that the crank 46 is driven at a generally sinusoidal rate such that when the wiper blades 12a and 14a are in the inwipe position (designated generally as IW in FIG. 1), the crank 46 is driven at a rate which is less than the rate of the driven gear 38. Likewise, when the blades 12a and 14aare in or approach an outwipe position (designated generally as OW in FIG. 1), the crank 46 is driven at a velocity which is less (by about 15% in this embodiment), than the input velocity 58, as shown in FIG. 4. Thus, it should be apparent that the rate at which the crank 46 is driven is substantially non-linear or harmonic relative to the movement of the driven gear 38.

It should also be appreciated that when the velocity 60 is substantially greater (by about 15% in this embodiment) than the input velocity 58 in FIG. 4, the blades 12a and 14a are driven towards and away from a first center wipe position (designated as FCWP in FIG. 1) and a second center of wipe position (designated as SCWP in FIG. 1), respectively. Notice that FCWP and SCWP are situated about midway between the inwipe (IN) and outwipe (OW) positions for blades 12a and 14a, respectively.

Advantageously, this invention provides a system, method and means for accelerating the wiper blades 12a and 14a, between inwipe and outwipe positions and decelerating the blades 12a and 14a as they approach and are in the inwipe and outwipe areas. It has been found that decelerating the blades 12a and 14a in the inwipe and outwipe areas facilitates reducing the wear and tear on the various components of wiper system 10, such as the linkage 32 (FIG. 1). Consequently, it has been found that the system and method of the present invention provides means for reducing the "robustness" required by the wiper system 10, thereby reducing the cost and weight of the wiper system 10 and its components.

A method for driving the wiper 12a and 14a at a non-linear rate will now be described. First, an operator may actuate wiper function switch 26 to turn the wiper system 10 to an on position. Wiper motor controller 20 energizes wiper motor 30 in response thereto and causes wiper motor 30 to drive the output shaft 36 (FIG. 2) at a substantially linear rate. The gear train 30 provided by gears 38, 42 and 44 cooperate to drive drive crank 46 at substantially non-linear rate in the manner describe earlier herein. As linkage arm 32c is driven back and forth in the direction of double arrow A in FIG. 1, wiper blades 12a and 14a wipe windshield 16a.

When wiping is no longer desired, the operator may actuate the wiper function switch 26 to an "off" position and thereby cause wiper motor controller 20 to stop wiper motor 30. If desired, the operator may actuate wiper function switch 26 to cause wiper motor controller 20 to initiate a wash cycle wherein wash motor 24 is energized along with wiper motor 30 in order to cause wash fluid (not shown) to be sprayed onto windshield surface 16a such that wipers 12a and 14a can wipe and clean the wiper area 18.

While the method and apparatus has been shown and described in connection with first and second gears 42 and 44 which are generally elliptical, it should be appreciated that their shape may be varied as desired to achieve desired wiper speed velocity. For example, the gears could be provided to have an offset axis or to have a cam shape.

While the method herein described, and the form of apparatus for carrying this method into effect, constitute preferred embodiments of this invention, it is to be understood that the invention is not limited to this precise method and form of apparatus, and that changes may be made in either without departing from the scope of the invention, which is defined in the appended claims.

What is claimed is:

1. A wiper system for wiping a windshield, said wiper system comprising:

at least one wiper; and a driver coupled to said at least one wiper for driving said at least one wiper at a non-linear velocity;

wherein said driver comprises a plurality of elliptical gears, said plurality of elliptical gears mating to cause said at least one wiper to be driven in a generally sinusoidal manner, such that in response to a linear input velocity, said non-linear velocity resulting from rotation of said plurality of elliptical gears and being at least 85%, but not more than 115%, of said linear velocity.

2. A wiper system for wiping a windshield, said wiper system comprising:

at least one wiper; and a driver coupled to said at least one wiper for driving said at least one wiper at a non-linear velocity in response to a linear input velocity, said non-linear velocity being at least 85%, but not more than 115%, of said linear velocity, wherein said driver comprises:

a drive shaft; and a gear coupled to a drive shaft and said at least one wiper, said gear defining a diametral line which is not circular; said nonlinear velocity resulting from rotation of said gear.

3. The wiper system as recited in claim 2 wherein said driver further comprises:

a drive motor having a drive shaft coupled to said gear;

an output shaft having a second gear coupled thereto, said second gear being in mating engagement and driven by said gear, said gear and said second gear each having an associated diametral line which is non-circular.

4. The wiper system as recited in claim 3 wherein said each of said associated diametral lines defines an oval.

5. The wiper system as recited in claim 3 wherein said drive motor drives said drive shaft at a first rate which is generally linear, said gear and said second gear driving said output shaft at a second rate which is non-linear in response to movement of said drive shaft.

6. A wiper system for wiping a windshield, said wiper system comprising:

at least one wiper;

a driver coupled to said at least one wiper for driving said at least one wiper at a non-linear velocity;

a drive motor having a drive shaft which has a linear output; and a drive chain situated between said drive shaft and said at least one wiper;

said drive chain comprising at least one non-circular gear coupling said drive shaft to an output shaft coupled to said at least one wiper to drive said at least one wiper at a nonlinear rate in response to a linear input velocity, said non-linear rate being at least 85%, but not more than 115%, of said linear velocity.

7. The wiper system as recited in claim 6 wherein said nonlinear rate comprises a first rate associated with an inwipe position, a second rate associated with an outwipe position and a third rate associated with a velocity at which said at least one wiper is driven between said inwipe and outwipe positions, said third rate being greater than said first and second rates.

8. The method as recited in claim 7 wherein said method further comprises the step of:

accelerating said at least one wiper between an inwipe position and an outwipe position.

9. The method as recited in claim 7 wherein said method comprises the step of:

decelerating said at least one wiper at an inwipe position and an outwipe position.

10. A method for wiping a windshield comprising the steps of:

driving at least one wiper at a sinusoidal rate having a high speed and a low speed and an approximate midpoint which defines an input velocity at which the motor rotatably drives at least one elliptical gear; and driving said at least one wiper with said at least one elliptical gear for coupling said at least one wiper to said driver.

11. A method for wiping a windshield comprising the steps of;

driving at least one wiper at a sinusoidal rate which varies from about 85% of an input velocity at which the drive motor rotatably drives at least one elliptical gear to not more than 115% of said input velocity; and driving a drive gear which is in mating engagement with a driven gear, said drive gear and said driven gear each comprising a diametral line which is non-linear.

12. The method as recited in claim 11 wherein said method further comprises the steps of:

transforming a linear input from a drive motor to a non-linear output for driving said at least one wiper.

13. The method as recited in claim 12 wherein said non-linear output comprises a corresponding function which is generally sinusoidal.

14. A method for wiping a windshield comprising the steps of:

driving at least one wiper at a sinusoidal rate which varies from about 85% of an input velocity at which a drive motor rotatably drives at least one elliptical gear to not more than 115% of said input velocity;

coupling a gear to a drive shaft of said drive motor;

coupling a second gear to an output shaft, and driving said second gear with said gear, said gear and said second gear each having an associated diametral line which is non-circular.

15. The method as recited in claim 14 wherein said each of said associated diametral lines defines an oval.

16. The method as recited in claim 14 wherein said method further comprises the step of:

energizing said drive motor to drive said drive shaft at a first rate which is generally linear, thereby causing said second gear to drive said output shaft at a second rate which is non-linear relative to the movement of said drive shaft.

17. A wiper motor drive system for use in a wiper system comprising:

a wiper motor comprising an output shaft, said wiper motor driving said output shaft at a substantially linear rate;

first gear means coupled to said output shaft;

second gear means for coupling to a wiper and also for being operatively coupled to said first gear means;

said first and second gear means being configured to drive said wiper at a non-linear rate in response to said wiper motor driving said output shaft.

18. The wiper motor drive system as recited in claim 17 wherein either said first or said second gear means comprises at least one gear having an axis of rotation, said at least one gear being asymmetrical about said axis of rotation.

19. The wiper motor drive system as recited in claim 17 wherein either said first or said second gear means comprises at least one gear having a generally elliptical shape.

20. The wiper motor drive system as recited in claim 17 wherein said first gear means comprises a first gear having a first gear axis of rotation, said second gear means comprising a second gear having a second gear axis of rotation, said first and second each being asymmetrical about said first gear axis of rotation and said second gear axis or rotation, respectively.

21. A method for driving at least one wiper at a non-linear rate, said method comprising the steps of:

energizing a linear drive motor to drive an output shaft at a substantially linear rate; and driving said at least one wiper at a non-linear rate in response to said linear drive motor, wherein said driving step further comprises the step of coupling said output shaft to a first gear which is not symmetrical about its axis;

said non-linear rate being at least 85%, but not more than 115%, of said substantially linear rate when said linear drive motor rotatably drives said first gear.

22. The method as recited in claim 21 wherein said non-linear rate is generally sinusoidal such that said at least one wiper is driven at a reversal velocity in an inwipe area and an outwipe area and a wipe velocity in between said inwipe and outwipe areas, said reversal velocity being less than said wipe velocity.

23. The method as recited in claim 21 wherein said reversal velocity is about 45 rpms.

24. The method as recited in claim 21 wherein said wipe velocity is about 20 rpms.

* * * * *